(12) United States Patent
Posamentier

(10) Patent No.: US 7,825,625 B2
(45) Date of Patent: Nov. 2, 2010

(54) WIRELESS CHARGING DEVICE WITH REFLECTED POWER COMMUNICATION

(75) Inventor: Joshua Posamentier, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 666 days.

(21) Appl. No.: 11/771,522

(22) Filed: Jun. 29, 2007

(65) Prior Publication Data
US 2009/0001929 A1 Jan. 1, 2009

(51) Int. Cl.
*H02J 7/00* (2006.01)
*H02J 7/04* (2006.01)
*H01F 27/28* (2006.01)

(52) U.S. Cl. .................... 320/108; 320/139; 336/182

(58) Field of Classification Search .................. 320/108
See application file for complete search history.

(56) References Cited

U.S. PATENT DOCUMENTS

| | | | |
|---|---|---|---|
| 2004/0145342 A1* | 7/2004 | Lyon | 320/108 |
| 2005/0127867 A1* | 6/2005 | Calhoon et al. | 320/108 |
| 2005/0127868 A1* | 6/2005 | Calhoon et al. | 320/108 |
| 2005/0162125 A1* | 7/2005 | Yu et al. | 320/108 |
| 2006/0061325 A1* | 3/2006 | Tang et al. | 320/108 |

* cited by examiner

Primary Examiner—Edward Tso
Assistant Examiner—Yalkew Fantu
(74) Attorney, Agent, or Firm—Grossman, Tucker, Perreault & Pfleger, PLLC

(57) ABSTRACT

Disclosed is a wireless charging device for charging electronic devices placed in a docking area of the wireless charging device. The wireless charging device includes an inductive coupler, a reflected power detector, a power source and a power control system. The inductive coupler is configured to charge at least one electronic device present in the docking area. The inductive coupler takes power form the power source. The inductive coupler is also configured to communicate with the electronic device to exchange a set of information. The reflected power detector is operably coupled to the inductive coupler and identifies the set of information exchanged by the inductive coupler. The power control system is operably coupled to the reflected power detector and the power source. The power control system controls the charging of the electronic device by the power source based on the set of information identified by the reflected power detector.

7 Claims, 2 Drawing Sheets

US 7,825,625 B2

WIRELESS CHARGING DEVICE WITH REFLECTED POWER COMMUNICATION

FIELD

The present disclosure generally relates to wireless charging devices and, more particularly, to a wireless charging device with reflected power communication for charging electronic devices.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION

For a thorough understanding of the present disclosure, refer to the following detailed description, including the appended claims, in connection with the above-described drawings. Although the present disclosure is described in connection with exemplary embodiments, the disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

The terms "a" and "an" herein do not denote a limitation of quantity, but rather denote the presence of at least one of the referenced item.

Figure 1:
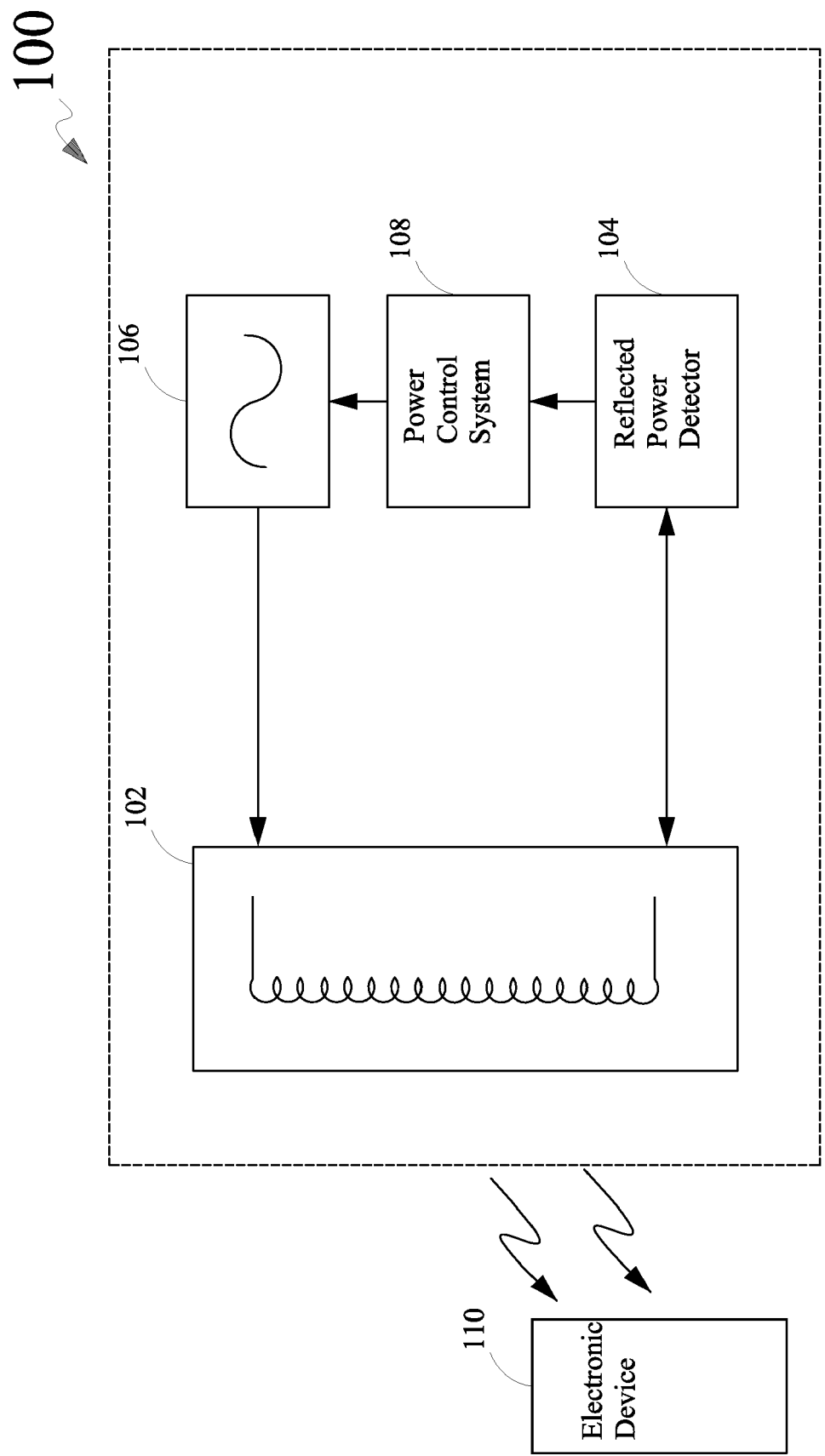
FIG. 1 is a block diagram illustrating a wireless charging device, according to an exemplary embodiment of the present disclosure.

The present disclosure provides a wireless charging device with reflected power communication. FIG. 1 is a block diagram illustrating a wireless charging device 100. The wireless charging device 100 is used for charging electronic devices in a wireless manner. In FIG. 1, the wireless charging device 100 is shown to charge an electronic device 110 for exemplary purposes only. It should be apparent to a person skilled in the art that the wireless charging device 100 may charge more than one electronic device at a time. Suitable examples of electronic devices that may be charged using the wireless charging device 100 include, but are not limited to, personal computers, multimedia devices, cellular phones, mp3 players, personal digital assistants, and any other wireless battery operated electronic device. The wireless charging device 100 includes an inductive coupler 102, a reflected power detector 104, a power source 106 and a power control system 108.

The inductive coupler 102 is an inductor coil, which acts like a primary side of a transformer. The inductive coupler 102 is configured to supply power, i.e., charge the electronic devices present in the docking area of the wireless charging device 100. Further, the inductive coupler 102 is also configured to maintain a communication link with the electronic device 110. The inductive coupler 102 exchanges a set of information with the electronic device 110. The set of information is used during the charging of the electronic device.

The set of information includes, but is not limited to, the presence of at least one electronic device in the docking area, charging requirement of the at least one electronic device, a charging state of the wireless charging device 100, and safety information corresponding to the charging of the at least one electronic device. The communication link between the inductive coupler 102 and the electronic device 110 may be a bidirectional link. The communication link can function as long as some amount of power is being supplied from the inductive coupler 102 to the electronic device 110. In an embodiment of the present disclosure, the set of information can be exchanged in a closed loop communication with the electronic device 110. The closed loop communication allows the electronic device 110 to constantly tune its output power characteristics such as its power requirement and its presence in the docking area of the wireless charging device 100 during the charging operation.

The reflected power detector 104 is operably coupled to the inductive coupler 102. The reflected power detector 104 identifies the set of information through the inductive coupler 102. The exchange of information is explained herein with the help of the following example. The charging requirement of each electronic device present in the docking area may be different. Such electronic devices need to communicate the wireless charging device 100 about their requirement. For example, the electronic device 110 may communicate that it requires n Volt×Inductive turns power supply to the inductive coupler 102. The inductive coupler 102 feeds the demand of power supply to the reflected power detector 104, which in turn, identifies the requirement of the power by the electronic device 110.

In an embodiment of the present disclosure, the reflected power detector 104 comprises an embedded modulator (not shown in FIG. 1). Using the embedded modulator, the wireless charging device 100 can maintain the knowledge of its charging state by modulating a charging field of the wireless charging device 100. Carrier wave used in the wireless charging device 100 may typically range between 60 Hz and 5 kHz. The carrier wave may be modulated directly by a sub-carrier modulation or Amplitude-Shift Keying (ASK).

The power control system 108 is operably coupled to the reflected power detector 104 and the power source 106. The power source 106 provides power to the inductive coupler 102 for charging the electronic device 110. The power control system 108 is configured to control the power source 106 based on the set of information identified by the reflected power detector 104. For example, the power control system 108 may direct the power source 106 to feed a particular amount of power to the inductive coupler 102 as required by the electronic device 110.

Figure 2:
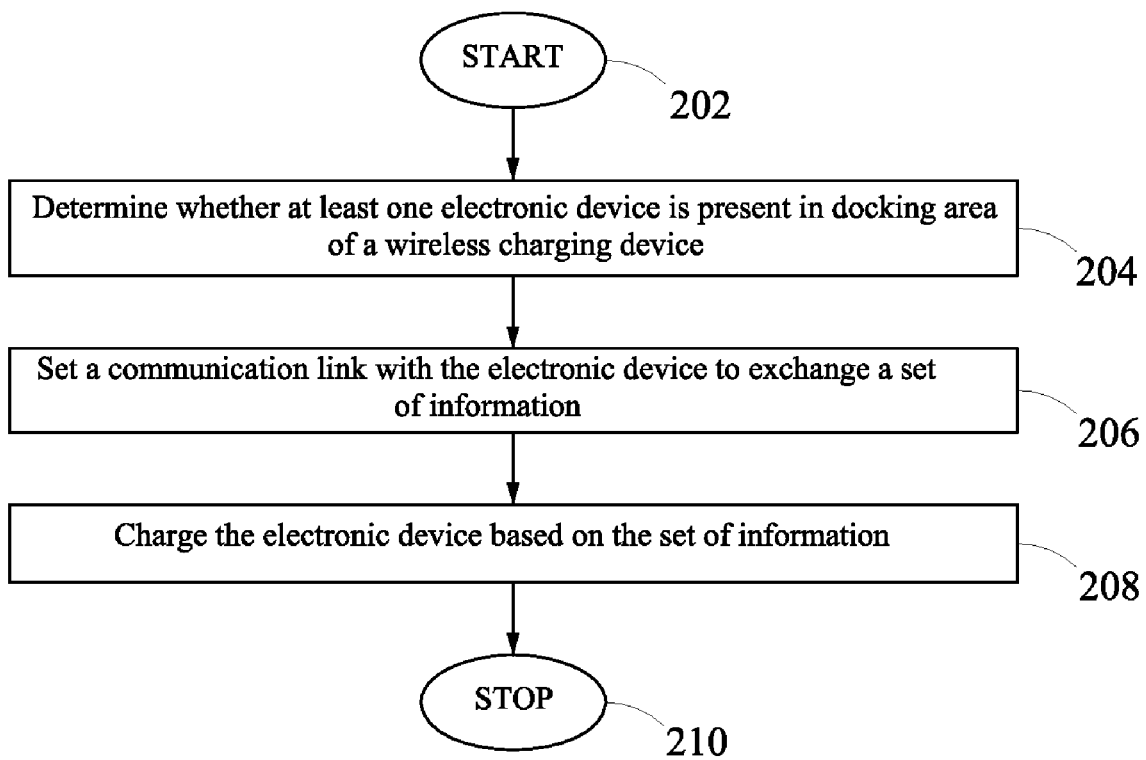
FIG. 2 is a flow diagram illustrating a method for charging electronic devices placed in a docking area of a wireless charging device, according to an exemplary embodiment of the present disclosure.

FIG. 2 illustrates a flow diagram of a method for charging electronic devices placed in the docking area of a wireless charging device 100. The method for charging initiates at 202. The method for charging electronic devices is performed at the wireless charging device 100. At 204, it is determined whether at least one electronic device is present in the docking area of the wireless charging device 100. The presence of the electronic device in the docking area is determined through a modulation in the inductive coupling impedance between the wireless charging device 100 and the electronic device.

Once the presence of the electronic device is determined, a set of information is exchanged between the wireless charging device 100 and the electronic device through the inductive coupling, at 206. The set of information includes, but is not limited to, a presence of the electronic device in the docking area, charging requirement of the electronic device, a charging state of the wireless charging device 100, and safety information corresponding to the charging of the electronic device. The set of information is exchanged by establishing a communication link with the electronic device. The communication link may be a bidirectional link.

At 208, the electronic device is charged based on the set of information. The set of information may be exchanged in a closed loop communication with the electronic device. For example, the electronic device may keep informing the wireless charging device 100 about its power requirement and any change in its special location, until it is charged completely. The wireless charging device 100 maintains the exchange of the set of information with the electronic device as long as some amount of the power is supplied to the electronic device. The wireless charging device 100 may modulate its charging field and the inductive load of the electronic device to exchange the set of information. The method for charging ends at 210.

The charging operation of the electronic device 110 by the wireless charging device 100 is explained herein using the following example. First, the wireless charging device 100 may be viewed as a base station which when powered on, sends a low amplitude carrier wave (CW) to its inductive coupler 102 (which will eventually be half a transformer). While doing this, it monitors the impedance of a coil of the inductive coupler 102. In another embodiment of the present disclosure, monitoring of the impedance can be done by actively measuring the insertion loss or reflected power from the inductive coupler 102. In yet another embodiment of the present disclosure, a directional coupler or circulator is also used when the carrier frequency is high enough (for example, carrier frequency >2 kHz).

The electronic device 110 has a complementary coil which can couple power from the wireless charging device 100 for charging the electronic device 110. Since the charging needs of various electronic devices present in the docking area may be different, they need to be able to communicate to the wireless charging device 100 about their power requirements and other information such as special location, safety information, and the like. This requires a method of communication. Similarly, the wireless charging device 100 needs to make sure that it does not power up if an extraneous thing is placed on top of it, for instance, a piece of aluminum foil, so that it does not attempt to transmit 90 W of power into a thin piece of metal and overheat in the process. The method of communication utilizes the fact that by modulating the inductive load in the electronic device 110 (by shunting or partially shunting or opening the coil in a pulse train pattern and creating an effective FSK backscatter signal for the wireless charging device 100), the reflected power detector 104 can pick up the FSK pulse train which can identify and communicate the needs of the electronic device 110 via a basic protocol.

The foregoing descriptions of specific embodiments of the present disclosure have been presented for purposes of illustration and description. They are not intended to be exhaustive or to limit the disclosure to the precise forms disclosed, and obviously many modifications and variations are possible in light of the above teaching. The embodiments were chosen and described in order to best explain the principles of the disclosure and its practical application, to thereby enable others skilled in the art to best utilize the disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A wireless charging device for charging electronic devices placed in a docking area of the wireless charging device, the wireless charging device comprising:
   an inductive coupler configured to
      charge at least one electronic device through an inductive coupling, wherein the electronic device is present in the docking area, and
      maintain a communication link with the at least one electronic device for exchanging of a set of information, the set of information used during the charging of the at least one electronic device;
   a reflected power detector operably coupled to the inductive coupler, said reflected power detector configured to identify the set of information received from the inductive coupler, wherein said reflected power detector further comprises an embedded modulator configured to modulate a charging field of said wireless charging device to maintain a closed loop communication with the at least one electronic device and to allow constant exchange of the set of information in a feedback manner;
   a power source capable of providing power to the inductive coupler; and
   a power control system operably coupled to the reflected power detector and the power source for constantly controlling the charging of the at least one electronic device by the power source through the inductive coupler based on the set of information identified by the reflected power detector in the closed loop communication during the charging operation.

2. The wireless charging device of claim 1, wherein the set of information comprises at least one of a presence of the at least one electronic device in the docking area, charging requirement of the at least one electronic device, a charging state of the wireless charging device, and safety information corresponding to the charging of the at least one electronic device.

3. The wireless charging device of claim 1, wherein the communication link is bidirectional between the wireless charging device and the at least one electronic device.

4. A method for charging electronic devices placed in a docking area of a wireless charging device, the method being performed at the wireless charging device, the method comprising:
   determining whether at least one electronic device is present in the docking area;
   setting a communication link with the at least one electronic device to exchange a set of information, wherein the set of information comprises at least one of a presence of the at least one electronic device in the docking area, charging requirement of the at least one electronic device, a charging state of the wireless charging device, and safety information corresponding to the charging of the at least one electronic device, wherein the setting the communication link comprises:
      modulating a charging field of the wireless charging device; and maintaining a closed loop communication with the at least one electronic device, wherein the closed loop communication allows constant exchange of the set of information in a feedback manner;

charging the at least one electronic device; and constantly controlling the charging of the at least one electronic device based on the set of information through an inductive coupling with the at least one electronic device in the closed loop communication during the charging operation.

5. The method of claim 4, wherein the determining whether the at least one electronic device is present in the docking area is performed through the inductive coupling.

6. The method of claim 4, wherein the setting the communication link is performed through the inductive coupling.

7. The method of claim 4, wherein the communication link is bidirectional between the wireless charging device and the at least one electronic device.

* * * * *